(12) United States Patent
Moeggenborg et al.

(10) Patent No.: US 7,255,810 B2
(45) Date of Patent: Aug. 14, 2007

(54) POLISHING SYSTEM COMPRISING A HIGHLY BRANCHED POLYMER

(75) Inventors: Kevin J. Moeggenborg, Naperville, IL (US); Fred F. Sun, Naperville, IL (US)

(73) Assignee: Cabot Microelectronics Corporation, Aurora, IL (US)

( * ) Notice: Subject to any disclaimer, the term of this patent is extended or adjusted under 35 U.S.C. 154(b) by 345 days.

(21) Appl. No.: 10/755,154

(22) Filed: Jan. 9, 2004

(65) Prior Publication Data

US 2005/0150598 A1 Jul. 14, 2005

(51) Int. Cl.
*C09K 13/00* (2006.01)
*C09K 13/06* (2006.01)
*H01L 21/302* (2006.01)

(52) U.S. Cl. .................... 252/79.1; 252/79.4; 438/692

(58) Field of Classification Search .............. 252/79.1, 252/79.4; 438/692, 92; 451/41, 36
See application file for complete search history.

(56) References Cited

U.S. PATENT DOCUMENTS

| | | | |
|---|---|---|---|
| 4,671,851 A | 6/1987 | Beyer et al. | |
| 4,789,648 A | 12/1988 | Chow et al. | |
| 4,910,155 A | 3/1990 | Cote et al. | |
| 4,944,836 A | 7/1990 | Beyer et al. | |
| 4,956,313 A | 9/1990 | Cote et al. | |
| 5,137,544 A | 8/1992 | Medellin | |
| 5,157,876 A | 10/1992 | Medellin | |
| 5,209,816 A | 5/1993 | Yu et al. | |
| 5,244,534 A | 9/1993 | Yu et al. | |
| 5,340,370 A | 8/1994 | Cadien et al. | |
| 5,354,490 A | 10/1994 | Yu et al. | |
| 5,391,258 A | 2/1995 | Brancaleoni et al. | |
| 5,476,606 A | 12/1995 | Brancaleoni et al. | |
| 5,527,423 A | 6/1996 | Neville et al. | |
| 5,741,626 A | 4/1998 | Jain et al. | |
| 5,767,014 A | 6/1998 | Hawker et al. | ............. 438/623 |
| 5,770,095 A | 6/1998 | Sasaki et al. | |
| 6,290,736 B1 | 9/2001 | Evans | |
| 6,379,223 B1 | 4/2002 | Sun et al. | |
| 6,468,589 B2 | 10/2002 | Nishikawa et al. | |
| 6,589,100 B2 * | 7/2003 | Moeggenborg et al. | ....... 451/41 |
| 2002/0064953 A1 | 5/2002 | Nishikawa et al. | |
| 2002/0125461 A1 * | 9/2002 | Chou et al. | ................ 252/79.1 |
| 2003/0153184 A1 | 8/2003 | Wang et al. | |
| 2003/0166337 A1 | 9/2003 | Wang et al. | |
| 2003/0170991 A1 | 9/2003 | Wang et al. | |

FOREIGN PATENT DOCUMENTS

EP 1 197 587 A 4/2002
EP 1279708 A1 * 1/2003

OTHER PUBLICATIONS

Poszimek, "A review of the analysis of branched polymers by SEC-MALS," *American Laboratory*, 34(1), Jan. 2002, 38-45.

* cited by examiner

*Primary Examiner*—Nadine G. Norton
*Assistant Examiner*—Lynette T. Umez-Eronini
(74) *Attorney, Agent, or Firm*—Thomas Omholt; Caryn Borg-Breen

(57) ABSTRACT

The invention provides a polishing system and method of its use comprising (a) a liquid carrier, (b) a polymer having a degree of branching of about 50% or greater, and (c) a polishing pad, an abrasive, or a combination thereof.

23 Claims, No Drawings

POLISHING SYSTEM COMPRISING A HIGHLY BRANCHED POLYMER

FIELD OF THE INVENTION

This invention pertains to a polishing system comprising a highly branched polymer for use in chemical-mechanical polishing.

BACKGROUND OF THE INVENTION

Integrated circuits are made up of millions of active devices formed in or on a substrate, such as a silicon wafer. The active devices are chemically and physically connected into a substrate and are interconnected through the use of multilevel interconnects to form functional circuits. Typical multilevel interconnects comprise a first metal layer, an interlevel dielectric layer, and sometimes a third and subsequent metal layer. Interlevel dielectrics, such as doped and undoped silicon dioxide ($SiO_2$) and/or low-κ dielectrics, are used to electrically isolate the different metal layers.

The electrical connections between different interconnection levels are made through the use of metal vias. U.S. Pat. No. 5,741,626, for example, describes a method for preparing dielectric TaN layers. Moreover, U.S. Pat. No. 4,789,648 describes a method for preparing multiple metallized layers and metallized vias in insulator films. In a similar manner, metal contacts are used to form electrical connections between interconnection levels and devices formed in a well. The metal vias and contacts may be filled with various metals and alloys, such as, for example, titanium (Ti), titanium nitride (TiN), aluminum copper (Al—Cu), aluminum silicon (Al—Si), copper (Cu), tungsten (W), platinum (Pt), ruthenium (Ru), iridium (Ir), and combinations thereof (hereinafter referred to as "via metals"). The via metals generally employ an adhesion layer (i.e., a barrier film), such as a titanium (Ti), titanium nitride (TiN), tantalum (Ta), tantalum nitride (TaN), tungsten (W), or tungsten nitride (WN) barrier film, to adhere the via metals to the $SiO_2$ substrate. At the contact level, the barrier film acts as a diffusion barrier to prevent the via metals from reacting with $SiO_2$.

In one semiconductor manufacturing process, metal vias and/or contacts are formed by a blanket metal deposition followed by a chemical-mechanical polishing (CMP) step. In a typical process, via holes are etched through an interlevel dielectric (ILD) to interconnection lines or to a semiconductor substrate. Next, a barrier film is formed over the ILD and is directed into the etched via hole. Then, a via metal is blanket-deposited over the barrier film and into the via hole. Deposition is continued until the via hole is filled with the blanket-deposited metal. Finally, the excess metal is removed by a chemical-mechanical polishing (CMP) process to form metal vias. Processes for the manufacturing and/or CMP of vias are disclosed in U.S. Pat. Nos. 4,671,851, 4,910,155, and 4,944,836.

Typical metal CMP systems contain an abrasive material, such as silica or alumina, suspended in an oxidizing, aqueous medium. U.S. Pat. No. 5,244,534, for example, discloses a system containing alumina, hydrogen peroxide, and either potassium or ammonium hydroxide, which is useful in removing tungsten with little removal of the underlying insulating layer. U.S. Pat. No. 5,209,816 discloses a system useful for polishing aluminum that comprises perchloric acid, hydrogen peroxide, and a solid abrasive material in an aqueous medium. U.S. Pat. No. 5,340,370 discloses a tungsten polishing system comprising potassium ferricyanide, potassium acetate, acetic acid, and silica. U.S. Pat. Nos. 5,391,258 and 5,476,606 disclose systems for polishing a composite of metal and silica including an aqueous medium, abrasive particles, and an anion, which controls the rate of silica removal. U.S. Pat. No. 5,770,095 discloses polishing systems comprising an oxidizing agent, a chemical agent, and an etching agent selected from aminoacetic acid and amidosulfuric acid. U.S. Pat. No. 6,290,736 discloses a polishing composition for polishing a noble metal surface comprising an abrasive, a halogen compound, and an aqueous basic solution. Other polishing systems for use in CMP processes are described in U.S. Pat. Nos. 4,956,313, 5,137,544, 5,157,876, 5,354,490, and 5,527,423.

Barrier films of titanium, titanium nitride, and like metals, such as tungsten, have a chemical activity similar to that of the via metals. Consequently, a single system can be used effectively to polish both Ti/TiN barrier films and via metals at similar rates. Ta and TaN barrier films, however, are significantly different from Ti, TiN, and like barrier films. Ta and TaN are relatively inert in chemical nature as compared to Ti and TiN. Accordingly, the aforementioned systems are significantly less effective at polishing tantalum layers than they are at polishing titanium layers (e.g., the tantalum removal rate is significantly lower than the titanium removal rate). While via metals and barrier metals are conventionally polished with a single system due to their similarly high removal rates, joint polishing of via metals and tantalum and similar materials using conventional polishing systems results in undesirable effects, such as oxide erosion and via metal dishing.

Similar problems with oxide erosion are observed when noble metals are used as the via metal. Noble metals have significantly lower chemical activity and are not adequately polished by conventional CMP compositions. Efficient planarization of noble metals often requires a CMP composition with an alkaline pH, resulting in undesirably higher removal rates of the oxide layer.

Consequently, there remains a need for a system, composition, and/or method of polishing a substrate comprising a first metal layer and a second layer in a manner such that planarization efficiency, uniformity, and removal rate of the first metal layer are maximized and planarization of the second layer is minimized, thereby minimizing undesirable effects, such as first metal layer dishing, surface imperfections, and damage to underlying topography. The invention provides such a system, composition, and method. These and other characteristics and advantages of the invention will be apparent from the description of the invention provided herein.

BRIEF SUMMARY OF THE INVENTION

The invention provides a polishing system comprising (a) a liquid carrier, (b) a polymer having a degree of branching that is about 50% or greater, and (c) a polishing pad, an abrasive, or a combination thereof. The invention further provides a method of polishing a substrate comprising (i) contacting a substrate with the polishing system and (ii) abrading at least a portion of the substrate to polish the substrate.

DETAILED DESCRIPTION OF THE INVENTION

The invention is directed to a polishing system, for example, a chemical-mechanical polishing (CMP) system, for use in polishing substrates such as semiconductor substrates. The polishing system comprises (a) a liquid carrier, (b) a highly branched polymer, and (c) a polishing pad, an abrasive, or a combination thereof.

The polishing system described herein desirably comprises an abrasive and a polishing pad. The abrasive can be in any suitable form (e.g., abrasive particles). The abrasive can be fixed on the polishing pad and/or can be in particulate form and suspended in the liquid carrier. The polishing pad can be any suitable polishing pad. The abrasive (when suspended in the liquid carrier) and the highly branched polymer, as well as any other components suspended in the liquid carrier, form the polishing composition of the polishing (e.g., CMP) system.

The abrasive can be any suitable abrasive, for example the abrasive can be natural or synthetic, and can comprise diamond (e.g., polycrystalline diamond), garnet, glass, carborundum, metal oxide, carbide, nitride, and the like. The abrasive desirably comprises a metal oxide. Suitable metal oxides include metal oxides selected from the group consisting of alumina, silica, titania, ceria, zirconia, germania, magnesia, co-formed products thereof, and combinations thereof. The abrasive particles typically have an average particle size (e.g., average particle diameter) of about 20 nm to about 500 nm. Preferably, the abrasive particles have an average particle size of about 70 nm to about 300 nm (e.g., about 100 nm to about 200 nm).

When the abrasive is present in the polishing system and is suspended in the liquid carrier (i.e., when the abrasive is a component of the polishing composition), any suitable amount of abrasive can be present in the polishing composition. Typically about 0.1 wt. % or more (e.g., about 0.5 wt. % or more) abrasive will be present in the polishing composition. More typically, about 1 wt. % or more abrasive will be present in the polishing composition. The amount of abrasive in the polishing composition typically will not exceed about 30 wt. %, more typically will not exceed about 20 wt. % (e.g., will not exceed about 10 wt. %).

A liquid carrier is used to facilitate the application of the abrasive (when present in the polishing composition), highly branched polymer, and any other additives to the surface of a suitable substrate to be polished or planarized. The liquid carrier can be any suitable liquid carrier. Typically, the liquid carrier is water, a mixture of water and a suitable water-miscible solvent, or an emulsion. Preferably, the liquid carrier comprises, consists essentially of, or consists of water, more preferably deionized water. Desirably, the highly branched polymer is soluble or emulsifiable in the liquid carrier.

The highly branched polymer can be any suitable polymer or copolymer. There are two general classes of highly branched polymers: tailored macromolecules having a well-defined structure (e.g., dendritic polymers, comb polymers, graft polymers, bottle brush polymers) and randomly (statistically) branched polymers. The polymer can be a dendritic polymer (e.g., a starburst dendrimer), a comb polymer or copolymer (e.g., a curtain-type polymer), a bottlebrush polymer or copolymer, a star-dendrimer hybrid polymer, a linear-dendrimer diblock copolymer, a linear-dendrimer triblock copolymer, a randomly branched polymer, or a combination thereof.

Dendritic polymers are polymers containing a central core monomer from which emanate two or more branched structures. Dendritic polymers ideally are perfectly branched (i.e., fully branched after every monomer); however, practical limitations of synthesis have lead to the development of one-pot dendritic polymers that are only near-perfectly branched. The core monomer can be selected from the group consisting of a $C_{1-8}$ heterocyclic ring, a $C_{1-8}$ carbocyclic ring, a $C_{1-8}$ alkane, a $C_{1-8}$ aminoalkane, an oxygen atom, a sulfur atom, and a nitrogen atom. The $C_{1-8}$ alkane and $C_{1-8}$ aminoalkane can be saturated, partially unsaturated, or fully unsaturated. Each branching level is referred to as a "generation." The dendritic polymer desirably comprises about 2 to about 10 generations, preferably about 3 to about 8 generations. The dendrimer can be prepared by a divergent approach, convergent approach, or a combination thereof. Comb and bottlebrush polymers consist of a linear polymer backbone comprising multiple polymer, copolymer, or dendritic polymer chains attached to the linear backbone.

Randomly-branched polymers can be formed via polycondensation of $AB_x$ monomers (e.g., $AB_2$, $AB_3$, or, $AB_4$ monomers), which introduce branching but do not allow gelation. In these polymers, the branching is controlled by statistics and only about 50% branching is obtained for an $AB_2$ monomer compared to 100% branching obtained from an $AB_2$ monomer in dendrimer synthesis. In addition, the size and structure of randomly-branched polymers typically cannot be controlled during preparation, such that randomly-branched polymers exhibit a broad molar mass distribution.

The highly branched polymers can comprise any suitable monomers. Examples of monomers that can be used to prepare such polymers include monomers selected from the group consisting of ethyleneimines, propyleneimines, resorcinols, penta-erythritols, amidoamines, amides, glycerols, caprolactones, combinations thereof, and the like. Typically, the polymer is selected from polyethyleneimines, polypropyleneimines, dendritic resorcinols, polyols such as polyglycerol, dendritic erythritols, polyamides, polyamidoamines, polyarylesters, polyalkylesters, and the like. Preferably, the polymer is a polyamidoamine (PAMAM).

The highly branched polymers optionally contain end-functional groups (i.e., surface functional groups) selected from the group consisting of amines, amides, carboxylic acids, sulfonic acids, phosphonic acids, hydroxyl groups, salts thereof, and combinations thereof. Preferably, the end-functional groups are selected from amines, carboxylic acids, hydroxyl groups, and salts thereof.

The highly branched polymers (in particular dendritic polymers) optionally can be functionalized with one or more polymer chains (e.g., linear polymer chains) to form hybrid polymer structures. For example, dendrimers can be functionalized with one or more linear polymers to form linear-dendrimer diblock copolymers, such as PAMAM-polyethylene oxide (PEO) diblock copolymer, linear-dendrimer triblock copolymers such as polyethylene oxide-polypropylene oxide-polyamidoamine (PEO-PPO-PAMAM) triblock copolymers, or star-dendrimer hybrid copolymers.

The highly branched polymer desirably has an ordered branching structure. For example, dendrimers typically are branched after every (or nearly every) monomer unit. Such structures are in contrast to randomly branched polymers, for example polyethyleneimine, which contains one potential branching site per monomer but has only a random chance of actually branching at each site. Highly branched polymers having an ordered branching structure typically have a more ordered three-dimensional structure compared to such randomly branched polymers.

The highly branched polymer desirably contains a highly branched core. The core can be a dendrimer core, a highly branched linear polymer chain, or the like. Thus, for comb or bottlebrush polymers, the core is a linear polymer chain. For dendritic polymers, the core is a dendrimer that optionally is functionalized with linear polymers.

The percentage of branched monomers in the highly branched polymer core often can be theoretically determined through analysis of the starting materials. Highly branched polymers preferably are characterized by a percent degree of branching. The degree of branching is equal to the number of branched sites divided by the total number of monomer sites that are capable of branching. Typically, the highly branched polymers of the invention have a percent degree of branching that is about 50% or greater (e.g., about 60% or greater). Preferably, the highly branched polymers have a degree of branching that is about 70% or greater (e.g., about 80% or greater). A polymer that is completely branched (i.e., a dendrimer) will have a degree of branching of 100%.

The degree of branching of a highly branched polymer can be determined by NMR spectroscopy. Typically, $^{13}C$ or $^{14}N$ NMR spectroscopy is used although any suitable spin-active nuclei can be used. The repeating units within the highly branched polymer will have different chemical shifts depending on their degree of substitution. For example, in highly branched polyamines, the repeating units contain amine groups that can function as branch points (i.e., tertiary amines) or as chain continuation or chain termination groups (i.e., secondary and primary amines, respectively). Each type of amine (e.g., primary, secondary, or tertiary) has a characteristic chemical shift in the NMR (e.g., $^{13}C$ NMR) spectrum. By integrating the peak area of the different amine peaks, the relative proportion of branching (e.g., tertiary amine) to non-branching (e.g., secondary and primary amines) can be determined giving rise to the degree of branching. Different chemical environments, such as the difference between primary and secondary amines, can lead to different relaxation times for the peaks observed in the NMR spectra. This phenomenon can lead to errors in the calculation of the branching ratio with NMR spectroscopy. However, when properly taken into account and with careful use of pulse sequences and long integration times, accurate ratios can be obtained. Such aspects of NMR spectroscopy will be understood by those of skill in the art. NMR simulation programs, many of which are known in the art, also can be used to predict the NMR spectrum to result from a polymer having a known degree of branching which can be compared to unknown spectra to further clarify the actual degree of branching in a given sample polymer.

Highly branched polymers, because of their three-dimensional structure, typically have a nonlinear relationship between their molecular weight and their viscosity. In particular, highly branched polymers tend to have a lower viscosity than the related linear polymers of the same composition and molecular weight. Preferably, the polymer has a viscosity that is about 70% or less (e.g., about 60% or less, about 50% or less, or about 40% or less) the viscosity of a linear polymer of the same monomer composition and molecular weight under the same conditions. The highly branched polymer can have any suitable molecular weight. Typically, the highly branched polymer has a molecular weight of about 1,000 to about 1,000,000 g/mol (e.g., about 2,000 to about 500,000 g/mol, or about 2,500 to about 250,000 g/mol). Desirably, the highly branched polymer does not substantially change the viscosity of the polishing composition. Preferably, addition of the highly branched polymer to the polishing composition results in a change in viscosity of the polishing composition that is about 10% or less (e.g., about 5% or less, or about 3% or less).

The highly branched polymer can act as a "stopping compound" that slows the removal of a substrate layer (e.g., metal layer or silicon-based insulating layer) that underlies a substrate layer to be removed by chemical-mechanical polishing. The highly branched polymer adheres to the surface of the underlying substrate layer through functional groups such as acids, amines, amides, or the like. The highly branched nature of the polymer is intended to improve the "stopping" properties of the polymer. While not wishing to be bound to any particular theory, highly-branched polymers are believed to generate a thicker polymer film on the surface of the underlying (e.g., oxide insulating) layer, thus further reducing the removal rate of such an underlying layer while not affecting the removal rate of other (e.g., metal) layers. Alternatively, the highly branched polymer may interact with the polishing abrasive to reduce scratching of the substrate layer being removed.

The polishing composition can have any pH suitable for its intended end-use. The polishing composition desirably has a pH in the range of about 2 to about 12 (e.g., about 2.5 to about 10.5, or about 3 to about 10) depending on the type of substrate to be polished. The polishing system can have a pH of less than about 7 (e.g., less than about 6, about 2 to about 5, or about 3 to about 4.5) or a pH of greater than about 7 (e.g., about 8 to about 14, about 9 to about 13, or about 10 to about 12). When the polishing system is used to polish a copper-containing substrate, the pH of the polishing composition preferably is about 3 to about 9. When the polishing system is used to polish a tantalum-containing substrate, the pH of the polishing composition preferably is about 8 to about 11. When the polishing system for tantalum polishing further comprises an oxidizer, the pH of the polishing composition preferably is about 4 to about 11. When the polishing system is used to polish a substrate layer comprising tungsten, the pH of the polishing composition preferably is about 1.5 to about 5. When the polishing system is used to polish a platinum-containing substrate, the pH of the polishing composition preferably is about 2 to about 7. When the polishing system is used to polish a ruthenium-containing substrate, the pH of the polishing composition preferably is about 5 or more (e.g., about 7 to about 11). When the polishing system is used to polish an iridium-containing substrate, the pH of the polishing composition preferably is about 5 to about 12 (e.g., about 7 to about 9).

The polishing composition optionally further comprises a chelating or complexing agent. The complexing agent is any suitable chemical additive that enhances the removal rate of the substrate layer being removed. Suitable chelating or complexing agents can include, for example, carbonyl compounds (e.g., acetylacetonates, and the like), simple carboxylates (e.g., acetates, aryl carboxylates, and the like), carboxylates containing one or more hydroxyl groups (e.g., glycolates, lactates, gluconates, gallic acid and salts thereof, and the like), di-, tri-, and poly-carboxylates (e.g., oxalates, phthalates, citrates, succinates, tartrates, malates, edetates (e.g., dipotassium EDTA), mixtures thereof, and the like), carboxylates containing one or more sulfonic and/or phosphonic groups, and the like. Suitable chelating or complexing agents also can include, for example, di-, tri-, or poly-alcohols (e.g., ethylene glycol, pyrocatechol, pyrogallol, tannic acid, and the like) and amine-containing compounds (e.g., ammonia, amino acids, amino alcohols, di-, tri-, and polyamines, and the like). The choice of chelating or complexing agent will depend on the type of substrate layer being removed.

It will be appreciated that many of the aforementioned compounds can exist in the form of a salt (e.g., a metal salt, an ammonium salt, or the like), an acid, or as a partial salt. For example, citrates include citric acid, as well as mono-, di-, and tri-salts thereof; phthalates include phthalic acid, as well as mono-salts (e.g., potassium hydrogen phthalate) and di-salts thereof; perchlorates include the corresponding acid (i.e., perchloric acid), as well as salts thereof. Furthermore, certain compounds or reagents may perform more than one function. For example, some compounds can function both as a chelating agent and an oxidizing agent (e.g., benzoyl peroxide and the like).

The polishing system optionally further comprises a means of oxidizing one or more components of the substrate. The means for oxidizing the substrate can be any suitable means for oxidizing the substrate, which includes any physical and/or chemical means. Suitable physical means for oxidizing the substrate include a device for applying a time-varying potential (e.g., anodic potential) to the substrate (e.g., electronic potentiostat), which preferably is utilized in a polishing system involving electrochemical polishing. Suitable chemical means for oxidizing the substrate include a chemical oxidizing agent, which preferably is utilized in a polishing system that does not involve electrochemical polishing.

The device for applying time-varying potential to the substrate can be any suitable such device. The means for oxidizing the substrate preferably comprises a device for applying a first potential (e.g., a more oxidizing potential) during an initial stage of the polishing and applying a second potential (e.g., a less oxidizing potential) at or during a later stage of polishing, or a device for changing the first potential to the second potential during an intermediate stage of polishing, e.g., continuously reducing the potential during the intermediate stage or rapidly reducing the potential from a first, higher oxidizing potential to a second, lower oxidizing potential after a predetermined interval at the first, higher oxidizing potential. For example, during the initial stage(s) of the polishing, a relatively high oxidizing potential is applied to the substrate to promote a relatively high rate of oxidation/dissolution/removal of the substrate. When polishing is at a later stage, e.g., when approaching an underlying barrier layer, the applied potential is reduced to a level producing a substantially lower or negligible rate of oxidation/dissolution/removal of the substrate, thereby eliminating or substantially reducing dishing, corrosion, and erosion. The time-varying electrochemical potential is preferably applied using a controllably variable DC power supply, e.g., an electronic potentiostat. U.S. Pat. No. 6,379,223 further describes a means for oxidizing a substrate by applying a potential.

The chemical oxidizing agent can be any suitable oxidizing agent. Suitable oxidizing agents include inorganic and organic per-compounds, bromates, nitrates, chlorates, chromates, iodates, iron and copper salts (e.g., nitrates, sulfates, EDTA, and citrates), rare earth and transition metal oxides (e.g., osmium tetraoxide), potassium ferricyanide, potassium dichromate, iodic acid, and the like. A per-compound (as defined by Hawley's Condensed Chemical Dictionary) is a compound containing at least one peroxy group (—O—O—) or a compound containing an element in its highest oxidation state. Examples of compounds containing at least one peroxy group include but are not limited to hydrogen peroxide and its adducts such as urea hydrogen peroxide and percarbonates, organic peroxides such as benzoyl peroxide, peracetic acid, and di-tert-butyl peroxide, monopersulfates ($So_5^{2-}$), dipersulfates ($S_2O_8^{2-}$), and sodium peroxide. Examples of compounds containing an element in its highest oxidation state include but are not limited to periodic acid, periodate salts, perbromic acid, perbromate salts, perchloric acid, perchlorate salts, perboric acid, perborate salts, and permanganates. The oxidizing agent preferably is hydrogen peroxide. The polishing composition typically comprises about 0.1 wt. % to about 15 wt. % (e.g., about 0.2 wt. % to about 10 wt. %, about 0.5 wt. % to about 8 wt. %, or about 1 wt. % to about 5 wt. %) oxidizing agent, based on the weight of the liquid carrier and any components dissolved or suspended therein.

The polishing system optionally further comprises a corrosion inhibitor (i.e., a film-forming agent). The corrosion inhibitor can be any suitable corrosion inhibitor. Typically, the corrosion inhibitor is an organic compound containing a heteroatom-containing functional group. For example, the film-forming agent is a heterocyclic organic compound with at least one 5- or 6-member heterocyclic ring as the active functional group, wherein the heterocyclic ring contains at least one nitrogen atom, for example, an azole compound. Preferably, the film-forming agent is a triazole, more preferably, 1,2,4-triazole, 1,2,3-triazole, or benzotriazole. The amount of corrosion inhibitor used in the polishing system typically is about 0.0001 wt. % to about 3 wt. %, preferably about 0.001 wt. % to about 2 wt. % based on the weight of the liquid carrier and any components dissolved or suspended therein.

The polishing system optionally further comprises a surfactant. Suitable surfactants can include, for example, cationic surfactants, anionic surfactants, nonionic surfactants, amphoteric surfactants, mixtures thereof, and the like. Preferably, the polishing system comprises a nonionic surfactant. One example of a suitable nonionic surfactant is an ethylenediamine polyoxyethylene surfactant. The amount of surfactant typically is about 0.0001 wt. % to about 1 wt. % (preferably about 0.001 wt. % to about 0.1 wt. %, or about 0.005 wt. % to about 0.05 wt. %) based on the weight of the liquid carrier and any components dissolved or suspended therein.

The polishing system optionally further comprises an antifoaming agent. The anti-foaming agent can be any suitable anti-foaming agent. Suitable antifoaming agents include, but are not limited to, silicon-based and acetylenic diol-based antifoaming agents. The amount of anti-foaming agent present in the polishing composition typically is about 20 ppm to about 140 ppm.

The polishing system optionally further comprises a biocide. The biocide can be any suitable biocide, for example an isothiazolinone biocide. The amount of biocide used in the polishing composition typically is about 1 to about 500 ppm, preferably about 10 to about 200 ppm.

The polishing system is intended for use in the chemical-mechanical polishing of substrates, such as microelectronic substrates (e.g., an integrated circuit, memory or rigid disk, metal, ILD layer, semiconductor, thin films, microelectromechanical system, ferroelectric, magnetic head, polymeric film, and low or high dielectric film). The method of polishing comprises the steps of (i) providing the polishing system, (ii) contacting the substrate with the polishing system, and (iii) abrading at least a portion of the substrate to polish the substrate. The substrate can comprise any suitable insulating, metal, or metal alloy layer (e.g., metal conductive layer). The insulating layer can be a metal oxide, porous metal oxide, glass, organic polymer, fluorinated organic polymer, or any other suitable high or low-K insulating layer. The metal layer can comprise any suitable metal including metals selected from the group consisting of copper, tantalum, tungsten, aluminum, titanium, platinum, rhodium, iridium, silver, gold, nickel, ruthenium, and combinations thereof.

Desirably, the polishing system is used in a method of polishing a substrate comprising at least one metal layer and a second (e.g., an insulating or metal) layer, wherein the first and second layers are not the same. The substrate is contacted with the polishing system, and at least a portion of the substrate (preferably the metal layer of the substrate) is abraded such that the substrate is polished. The polishing system is particularly well suited for polishing noble metal-containing substrates, especially those used in the electronics industry. The substrate preferably comprises a noble metal selected from the group consisting of rhenium, ruthenium, rhodium, palladium, silver, osmium, iridium, platinum, and gold. In a more preferred embodiment, the noble metal is platinum, ruthenium, or iridium. Noble metal layers tend to be mechanically hard and chemically resistant, and the removal rates for the underlying (e.g., insulating layer such as oxide) are often high under the conditions required to remove the noble metal. The highly branched polymer of the polishing system desirably protects the underlying (e.g., insulating such as oxide) layer of a substrate comprising a noble metal layer, while maintaining a high removal rate with respect to the noble metal layer.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A polishing system comprising:
   (a) a liquid carrier,
   (b) a branched polymer having a degree of branching of about 50% or greater, and
   (c) a polishing pad, an abrasive, or a combination thereof.

2. The polishing system of claim 1, wherein the degree of branching is about 60% or greater.

3. The polishing system of claim 2, wherein the degree of branching is about 70% or greater.

4. The polishing system of claim 1, wherein the branched polymer is selected from the group consisting of dendritic polymers, comb polymers, bottle-brush polymers, linear-dendrimer diblock copolymers, linear-dendrimer triblock copolymers, random-branched polymers, copolymers thereof, and combinations thereof.

5. The polishing system of claim 4, wherein the branched polymer is a linear-dendrimer diblock copolymer.

6. The polishing system of claim 5, wherein the linear-dendrimer diblock copolymer is a polyethylene oxide-polyamidoamine (PEO-PAMAM) diblock copolymer.

7. The polishing system of claim 4, wherein the branched polymer is a linear-dendrimer triblock copolymer.

8. The polishing system of claim 7, wherein the linear-dendrimer triblock copolymer is a polyethylene oxide-polypropylene oxide-polyamidoamine triblock copolymer.

9. The polishing system of claim 4, wherein the branched polymer is a dendritic polymer.

10. The polishing system of claim 9, wherein the dendritic polymer comprises a core monomer selected from the group consisting of a $C_{1-8}$ heterocyclic ring, a $C_{1-8}$ carbocyclic ring, a $C_{1-8}$ alkane, and a $C_{1-8}$ aminoalkane.

11. The polishing system of claim 9, wherein the dendritic polymer branches from a nitrogen atom.

12. The polishing system of claim 9, wherein the dendritic polymer comprises about 2 to about 10 generations.

13. The polishing system of claim 1, wherein the branched polymer is a polyamidoamine (PAMAM) polymer.

14. The polishing system of claim 1, wherein the branched polymer is a polyglycerol.

15. The polishing system of claim 1, wherein the branched polymer comprises surface functional groups selected from the group consisting of amines, amides, carboxylic acids, sulfonic acids, phosphonic acids, hydroxyl groups, salts thereof, and combinations thereof.

16. The polishing system of claim 1, wherein the branched polymer has a molecular weight of about 1,000 to about 1,000,000 g/mol.

17. The polishing system of claim 16, wherein the molecular weight is about 2,000 to about 500,000 g/mol.

18. The polishing system of claim 1, wherein the branched polymer comprises a highly branched core comprising monomers, wherein about 50% or more of the monomers within the highly branched core are branched.

19. The polishing system of claim 1, wherein the branched polymer has a viscosity that is about 70% or less the viscosity of a linear polymer of the same monomer composition and molecular weight under the same conditions.

20. The polishing system of claim 1, wherein the system comprises an abrasive suspended in the liquid carrier.

21. The polishing system of claim 1, wherein the system comprises an abrasive fixed to a polishing pad.

22. The polishing system of claim 1, further comprising one or more polishing additives selected from the group consisting of chelating or complexing agents, oxidizing agents, surfactants, anti-foaming agents, biocides, and combinations thereof.

23. A method of polishing a substrate comprising:
   (i) contacting a substrate with the polishing system of claim 1, and
   (ii) abrading at least a portion of the substrate to polish the substrate.

* * * * *